Patented Jan. 23, 1951

2,539,192

UNITED STATES PATENT OFFICE 2,539,192

VAT DYESTUFFS AND PROCESS OF MAKING SAME

Walter Kern, Sissach, and Theodor Holbro, Basel, Switzerland, assignors to Ciba Limited, a Swiss firm No Drawing. Application March 24, 1947, Serial No. 736,622. In Switzerland March 29, 1946

13 Claims. (Cl. 260—316)

The present invention relates to vat dyestuffs of the carbazole series. It is already known that vat dyestuffs of the said series can be made by reacting catalysts of the Friedel-Crafts type with anthrimides, i. e. compounds of the type anthraquinone-NH-anthraquinone whereby ring closure to form one or more carbazole rings occurs. It is an object of the present invention to provide new dyestuffs of the kind referred to which possess unexpected valuable properties concerning shade, applicability, fastness, etc. More particularly it is an object of the present invention to provide dyestuffs which contain the radical of a phthaloyl derivative of a polynuclear compound such as fluoranthene and especially pyrene. Further objects will appear as the specification proceeds and others are obvious.

According to this invention valuable vat dyestuffs are made by treating with a carbazolizing agent a compound of the general formula

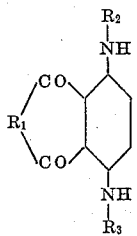

in which $R_1$ represents a non-vattable residue containing at least 4 condensed rings, and $R_2$ and $R_3$ each represent a vattable residue.

The compounds of the above general formula used as starting materials in the invention can be obtained, for example, by reacting a 3':6'-dihalogen-phthaloyl-derivative of the compound corresponding to the polynuclear residue with a vattable amine. The aforesaid phthaloyl-derivatives are in part known and in part new. In so far as they are new they can be prepared by methods in themselves known, more especially by the reaction of a 3:6-dihalogen-phthalic acid or the anhydride thereof with a polynuclear hydrocarbon, for example, fluoranthane, pyrenoline and especially pyrene, or a substitution product of such a hydrocarbon (compare German Patents Nos. 590,579, 624,918 and 733,756). As residues $R_1$ in the above formula there come into consideration, for example, those which are of substantially aromatic character, and especially those derived from tetranuclear compounds having angularly fused rings, which in addition to 6-membered carbon rings contain at most one 5-membered carbon ring and are free from methylene groups.

A very wide variety of vattable amines may be used for reaction with above mentioned 3':6'-dihalogen-phthaloyl compounds. For this purpose there may primarily be mentioned aminoanthraquinones, in which the amino group which enters into reaction advantageously occupies an α-position. In other respects these amino-anthraquinones may be free from substituents or may contain substituents such as may usually be present in vat dyestuffs, for example, halogen atoms, alkoxy groups, acylamino especially benzoylamino groups, and also amino groups in which at least one hydrogen atom has been replaced by an aliphatic or aromatic residue, for example, a further anthraquinone residue. As examples, there may be mentioned 1-aminoanthraquinone, 1-amino-4- or -5- or -8-benzoylaminoanthraquinone, aminoanthraquinone acridones and also anthrimides, especially dianthrimides having a free amino group, for example, 4-amino-1:1'-dianthrimide.

The reaction of the above mentioned 3':6'-dihalogen-phthaloyl-compounds with the above mentioned vattable amines may be carried out in known manner, for example, by heating them in a boiling solvent such as nitrobenzene or naphthalene, advantageously with the addition of an acid-binding agent and, if desired, a catalytically acting agent (copper or copper compounds). It is also possible to introduce radicals $R_2$ and $R_3$ which are different among themselves into the molecule of the starting dyestuff, for example, by allowing two different vattable amines to act simultaneously or subsequently on the dihalogenphthaloyl compounds. In many cases it is of advantage to treat the starting materials so obtained with substituting, preferably halogenating agents, for example, with sulfuryl chloride in the presence of a halogen carrier, such as iodine.

The compounds of the above general formula serving as starting materials in the invention may, if desired, be obtained by other methods, for example, by reacting amino-phthaloyl-compounds with halogen substitution products of vattable compounds.

In the process of the invention these starting materials are treated with carbazolizing agents. Among the latter aluminium chloride is of special technical importance. The carbazolizing reaction may be carried out, if desired, in a suitable aluminium chloride melt containing a diluent or with the aid of an aluminium chloride addition compound. Thus, there may be used mixtures of aluminium chloride with sodium chloride, mixtures of aluminium chloride with tertiary bases, especially pyridine and homologues of pyridine, addition compounds of aluminium chloride with sulfur dioxide and similar carbazolizing agents. Depending on the choice of the diluent and the starting material it may be of advantage to conduct the carbazolization at a relatively low temperature, for example, below 100° C., or at a higher temperature, for example, ranging from 100° C. to 120° C. or at an even higher temperature, for example, 140° C. or above.

In many cases it is of advantage to subject the compounds which are richer in hydrogen as the result of the carbazolization reaction to dehydrogenation or oxidation, for example, by the action of nitriles, hypochlorites, chromates or similar oxidizing agents, especially in a solution of an acid for example, sulfuric acid solution.

The invention also includes subjecting a vat dyestuff obtained as described above to the action of an agent bringing about substitution, and, if desired, a condensing agent. For example, the dyestuff may be halogenated. Furthermore, it is in some cases of advantage to introduce benzoyl or phthaloyl residues into the dyestuffs subsequently to or simultaneously with the carbazolization. In this case further ring closure can be brought about by the action of a condensing agent.

The products of the invention are vat dyestuffs and correspond probably to the general formula

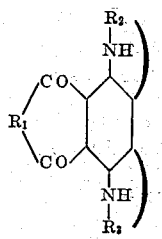

wherein $R_1$ represents a non-vattable radical containing at least 4 condensed rings, and $R_2$ and $R_3$ are vattable radicals. Thus $R_1$ may stand especially for a fluoranthene radical or preferably a pyrene radical and contain substituents, if necessary, whereas $R_2$ and $R_3$ may contain especially anthraquinone groupings, for example, anthraquinone or dianthrimide radicals.

The present vat dyestuffs can be applied in the usual manner in dyeing and printing a very wide variety of fibers, especially cellulosic fibers such as cotton, linen, and artificial silk and staple fibers of regenerated cellulose. They may also be used as dyestuff pigments, and can be converted into leuco-ester salts, which may be used for dyeing and printing by the methods known for that type of dyestuffs.

The invention enables valuable olive to grey dyestuffs, among others, to be made. Among these dyestuffs are included those which dye from strongly alkaline baths at a high dyeing temperature.

It has already been proposed to treat with carbazolizing agents compounds which are probably isomeric with the starting materials used in this invention (compare French Patent No. 725,350). The products obtained by the present invention are distinguished in part by yielding dyeings of different tint and in part by yielding dyeings of improved properties of fastness and by their improved applicability.

The following examples illustrate the invention, the parts being by weight unless otherwise stated, and the relationship of parts by weight to parts by volume being the same as that of the kilogram to the liter:

*Example 1*

60 parts of aluminium chloride are introduced into 130 parts of dry pyridine, and 10 parts of the pyridine are removed by distillation. At a temperature of 121–123° C. 6 parts of the condensation product of 3':6'-dichloro-3:4-phthaloyl-pyrene and 1-aminoanthraquinone of the formula

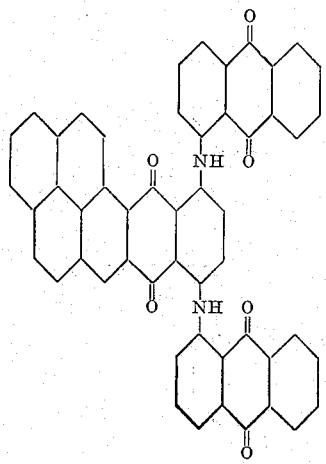

are added, and the whole is stirred at that temperature for one hour; the carbazolization is then complete. The melt is introduced into water, rendered alkaline with caustic soda solution, vatted with sodium hydrosulfite, and the whole is filtered to remove a small quantity of impurities. After blowing air through the mixture, filtering, and washing and drying the filter residue, the dyestuff is obtained in the form of a dark powder which dissolves in concentrated sulfuric acid with a reddish brown coloration, and dyes cotton fast blackish brown tints from a red-brown vat. Somewhat greener shades are obtained if, after the dyestuff has been treated with the blast of air and filtered, it is after-oxidized in solution in sulfuric acid with bichromate at a raised temperature.

Dyestuffs dyeing very similar tints are obtained by conducting the carbazolization at a temperature of 140° C. or by using only 30 parts of aluminium chloride and about 70 parts of pyridine.

By chlorinating the dyestuff obtained as described in the first paragraph of this example in nitrobenzene with sulfuryl chloride with addition of iodine, or brominating it in chlorosulfonic acid with bromine and traces of iodine, further dyestuffs are obtained which yield blackish brown to olive brown tints. The starting material used in this example may be prepared as follows:

24 parts of 3':6'-dichloro-3:4-phthaloyl-pyrene (obtained from pyrene and 3:6-dichlorophthalic anhydride as described in German Patent No. 589,145, and subsequently splitting off water by means of phosphorus pentoxide in trichlorobenzene. Orange needles melting at 336–338° C.), 28.8 parts of α-aminoanthraquinone, 13.3 parts of anhydrous sodium carbonate and 1.2 parts of copper acetate in 480 parts of dry nitrobenzene are maintained at the boil for 8 hours, while stirring. The precipitated condensation product is separated by filtering with suction in the cold, washed with nitrobenzene and then with alcohol, and extracted by boiling with dilute hydrochloric acid. A crystalline, violet powder melting at 390–393° C. is obtained, which dissolves in concentrated sulfuric acid with an olive-green coloration.

The reaction product obtained in analogous manner from 24 parts of 3':6'-dichloro-3:4-phthaloylpyrene and 33.3 parts of a technical mixture of 1-amino-6- and -7-chloroanthraquinone, when carbazolated as described in the first paragraph of this example, yields a dyestuff which dyes cotton yellowish brown tints.

*Example 2*

25 parts of aluminium chloride, 5 parts of potassium chloride and 3.5 parts of sodium chloride are melted at 112–117° C., and 1.5 parts of the dyestuff obtained as described in the first paragraph of Example 1 and 1.0 part of benzoyl chloride are introduced. The temperature is then raised to 140° C., and the whole is stirred at that temperature for 2 hours, and air is blown through the mixture. After cooling, the reaction mass is disintegrated, introduced into dilute hydrochloric acid, and the dyestuff is separated by filtering with suction, washed, and extracted by boiling with a dilute solution of sodium carbonate. The dyestuff is a dark powder, which dissolves in concentrated sulfuric acid with a dirty violet coloration and dyes cotton fast olive-brown tints from a reddish brown vat.

By replacing the benzoyl chloride by 3 parts of phthalic anhydride, and stirring in the aforesaid melt of aluminium chloride, potassium chloride and sodium chloride for 6–8 hours at 125–150° C. without introducing air, a dyestuff is likewise obtained which yields fast brown tints.

*Example 3*

The condensation product of 3':6'-dichloro-3:4-phthaloyl-pyrene and 1-aminoanthraquinone obtained as described in the penultimate paragraph of Example 1 is chlorinated with sulfuryl chloride with an addition of iodine without being isolated, and melted with aluminium chloride and pyridine by the procedure described in the first paragraph of Example 1. The resulting dyestuff is a black powder, which dissolves with a brown-violet coloration in concentrated sulfuric acid and dyes cotton brown tints from a red-brown vat. It corresponds to the formula

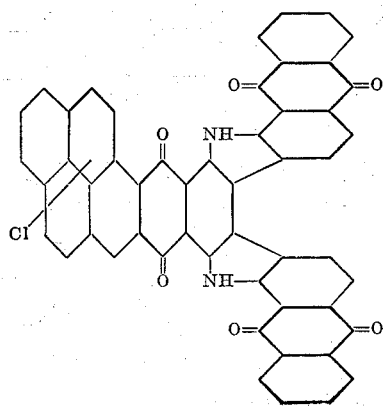

By brominating the condensation product of 3':6'-dichloro-3:4-phthaloyl-pyrene and 1-aminoanthraquinone in chlorosulfonic acid, and subsequently carbazolizing as described in the first paragraph of Example 1 a dyestuff is obtained similar to that described in the first paragraph of this example.

*Example 4*

54 parts of aluminium chloride and 11.2 parts of sodium chloride are melted at 120° C., and 2.0 parts of the condensation product of 3':6'-dichloro-3:4-phthaloyl-pyrene and 1-aminoanthraquinone (see the formula in Example 1) are introduced. After stirring for 2 hours at 130–135° C. the whole is introduced into water and ice, the precipitate is separated by filtering with suction, formed into a paste, acidified with sulfuric acid at 10 per cent. strength, and after-oxidized with 0.6 part of sodium nitrite. After being filtered, washed and dried, the dyestuff is a dark powder, which dissolves with a yellow-olive coloration in concentrate sulfuric acid, and dyes cotton blackish olive tints.

*Example 5*

19 parts of aluminium chloride are added to 38 parts of nitrobenzene, and then 2 parts of the condensation product of 1 mol of 3':6'-dichloro-3:4-phthaloyl-pyrene and 2 mols of 1-amino-4-benzoylamino-anthraquinone are added. The temperature is raised in the course of ½ hour to 90° C., while stirring, and maintained thereat for one hour. After introducing the whole into water, the nitrobenzene is removed by means of steam. The dyestuff is separated by filtration, washed, and after-oxidized with sodium nitrite in solution in sulfuric acid for the purpose of further purification. It is a black powder, which dissolves in concentrated sulfuric acid with a dirty green coloration, and dyes cotton blackish brown tints from a red-brown vat. It corresponds to the formula

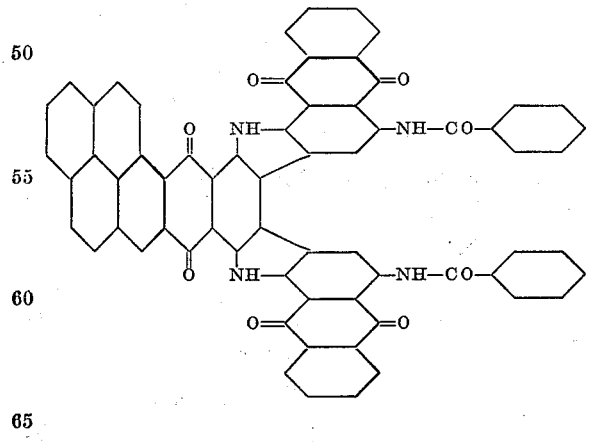

A similar product which dyes somewhat blacker tints is obtained by using, instead of nitrobenzene and aluminium chloride, the known melt prepared from aluminium chloride, sodium chloride and sulfur dioxide.

The condensation product of 1 molecular proportion of 3':6'-dichloro-3:4-phthaloylpyrene and 2 molecular proportions of 1-amino-5-benzoylaminoanthraquinone, when carbazolated at 75–80° C. with the mixture of aluminium chloride and nitrobenzene mentioned in the first paragraph of this example or with the mixture indicated in the second paragraph hereof, yields dyestuffs which dyes brown tints.

The condensation products obtained by successive reaction of 3':6'-dichloro-3:4-phthaloyl-pyrene with one molecular proportion of 1-amino-4-benzoylaminoanthraquinone and one molecular proportion of 1-amino-5-benzoylamino-anthraquinone leads to a dyestuff of the formula

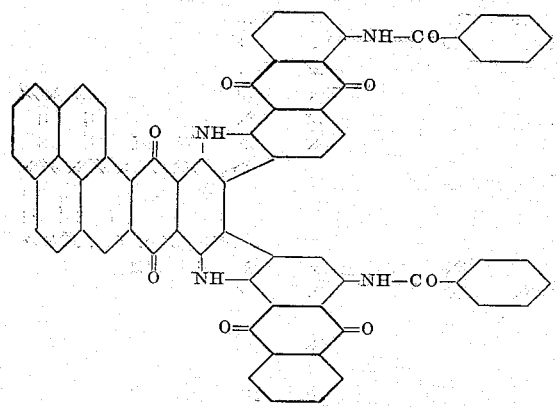

which dyes cotton from a brown vat blackish brown shades.

*Example 6*

1.5 parts of the condensation product of 1 molecular proportion of 3':6'-dichloro-3:4-phthaloyl-pyrene and 2 molecular proportions of 4-amino-1:1'-dianthrimide of the formula

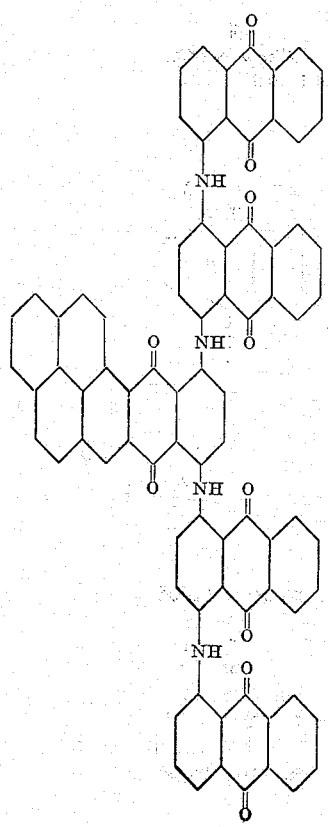

are introduced into a melt of 20 parts of aluminium chloride and 50 parts of dry pyridine at 100° C. The temperature is then raised in the course of ½ hour to 140–142° C. while simultaneously distilling a part of the pyridine, and the whole is stirred for a further ½ hour at that temperature. The melt is then introduced into water, rendered alkaline with caustic soda solution, and vatted with hydrosulfite. After removing a small quantity of residue, the dyestuff is treated with an air blast, separated by filtering with suction, washed, and dried. It is a dark powder which dissolves in concentrated sulfuric acid with a dark brown coloration and dyes cotton very fast black-olive tints from a red-brown vat.

A similar dyestuff is obtained by prolonging the reaction period to 1 to 2 hours, or by stirring for 2 hours at 128–132° C.

The dyestuff obtained as described in the first paragraph of this example may be dissolved in cholorosulfonic acid and brominated, a brown-black dyestuff being obtained.

By further condensation of the dyestuff of the first paragraph of this example in a melt of aluminium chloride, potassium chloride and sodium chloride with benzoyl chloride or phthalic anhydride a new olive to brown dyestuff is obtained.

The starting material used in this example is obtained in the following manner:

6 parts of 3':6'-dichloro-3:4-phthaloyl-pyrene (see Example 1), 13.4 parts of 4-amino-1:1'-dianthrimide, 3.3 parts of sodium carbonate and 0.3 part of copper acetate in 156 parts of nitrobenzene are maintained at the boil for 8 hours. After cooling, the condensation product, which is precipitated in quantitative yield, may be separated by filtration, washed, and extracted by boiling with dilute hydrochloric acid. It is a black crystalline powder, which dissolves in concentrated sulfuric acid with a green to olive-green coloration.

*Example 7*

The condensation product obtained as described in the last paragraph of Example 6 is subsequently chlorinated, without being isolated, at 60–70° C., with sulfuryl chloride with the addition of iodine, and then melted with aluminium chloride and pyridine at 140° C. as described in the first or second paragraph of Example 6. A black powder is obtained which dissolves in concentrated sulfuric acid with a black-brown coloration, and dyes cotton very fast olive-grey tints from a brown vat. It corresponds to the formula

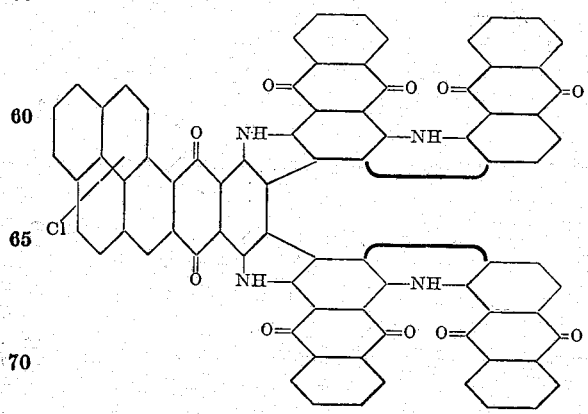

By after-oxidation with sodium nitrite in solution in sulfuric acid the tint of the dyeings becomes somewhat redder.

A very similar dyestuff is also obtained by treating at 140–142° C. in the indicated manner 5 parts of the after-chlorinated condensation product with 25 parts of aluminium chloride and 55 parts of pyridine.

By chlorinating the condensation product (of the last paragraph of Example 6) more strongly at a higher temperature about 2 atoms of chlorine enter the molecule. By melting with aluminium chloride and pyridine by the procedures described in the first and second paragraphs of Example 6 a dyestuff is obtained, which dissolves in concentrated sulfuric acid with a brown coloration, and dyes cotton intense and very fast black-olive tints from a brown vat.

The chlorination can be effected with thionyl chloride instead of sulfuryl chloride. Bromination with bromine (in the presence of some iodine) leads to products containing from one to two bromine atoms in the molecule. On treatment with aluminium chloride as described above dyestuffs of rather similar shades are obtained.

Example 8

30 parts of aluminium chloride and 3.6 parts of sodium chloride are intimately mixed together and melted at 140° C. 1.5 parts of the condensation product of 3':6'-dichloro-3:4-phthaloyl-pyrene and 5-amino-1:1'-dianthrimide are then introduced at 140–145° C., and the whole is stirred for 2 hours at 165–168° C. After introducing the product into ice and water, it is acidified with dilute sulfuric acid, and after-oxidized with 0.9 part of sodium bichromate at ordinary temperature. A brown-black powder is obtained, which dissolves in concentrated sulfuric acid with a dirty violet coloration, and dyes cotton yellowish brown tints from a red-brown vat. It corresponds to the formula

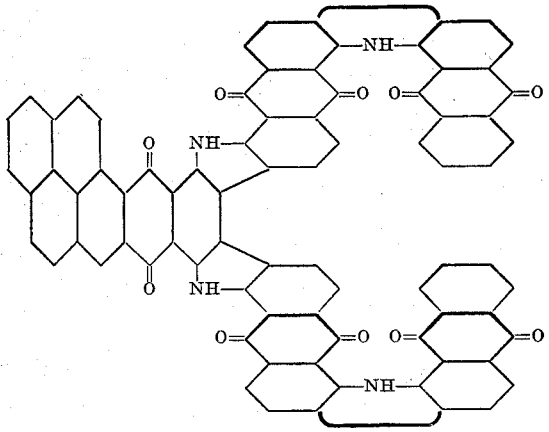

The condensation product used in the preceding paragraph of this example can be obtained from 1 molecular proportion of 3':6'-dichloro-3:4-phthaloyl-pyrene and 2 molecular proportions of 5-amino-1:1'-dianthrimide in boiling nitrobenzene with the addition of a copper salt in the usual manner.

Example 9

12 parts of the condensation product obtained in the usual manner from 1 molecular proportion of 3':6'-dichloro-3:4-phthaloyl-pyrene and 2 molecular proportions of 4-aminoanthraquinone-2:1-(N)-1':2'-(N)-benzacridone, and having the formula

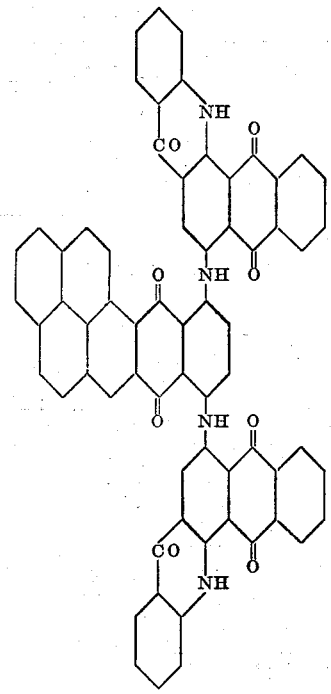

are introduced at 100° C. into a melt of 120 parts of aluminium chloride and 300 parts of dry pyridine, and the temperature is raised to 140–142° C. while simultaneously distilling pyridine. After stirring for 3¾ hours at that temperature, the whole is introduced into water, rendered alkaline, vatted, and filtered to remove some insoluble material. By blowing air through the mixture the dyestuff is obtained in the form of an olive-black powder, which dissolves in concentrated sulfuric acid with a brown-black coloration, and dyes cotton very fast and pure olive-green tints from a black-brown vat.

Example 10

20 parts of aluminium chloride and 50 parts of dry pyridine are heated to boiling and 10 parts of pyridine are distilled. 2 parts of the condensation product of the formula:

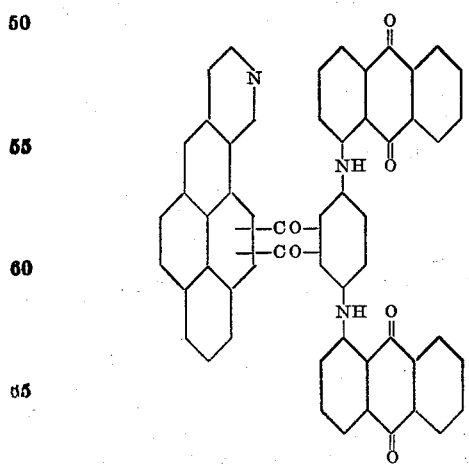

are introduced at a temperature of 121–123° C., and the whole is stirred for 2 hours at that temperature. The whole is then introduced into water, rendered alkaline with caustic soda solution, vatted with sodium hydrosulfite, filtered to remove some insoluble material, and the dyestuff is precipitated by blowing in air. It is a dark powder, which dissolves in concentrated sulfuric acid with a black-olive coloration, and dyes cotton olive tints from a red-brown vat.

The condensation product used in the preceding paragraph is obtained by heating 1 molecular proportion of 3':6'-dichloro-monophthaloyl-pyrenoline with 3:6-dichlorophthalic anhydride with a mixture of aluminium chloride and sodium chloride at 150° C. (see British Patent No. 476,988) and 2 molecular proportions of 1-aminoanthraquinone in nitrobenzene with the addition of a copper salt.

Example 11

1.5 parts of the condensation product, obtainable by heating 1 molecular proportion of 3':6' - dichloro - monophthaloyl - pyrenoline (see British Patent No. 476,988) and 2 molecular proportions of 4-amino-1:1'-dianthrimide in nitrobenzene with the addition of copper acetate, are introduced at 100° C. into a melt of 20 parts of aluminium chloride and 50 parts of dry pyridine, and the temperature is raised to 140-142° C., a small quantity of pyridine being distilled. The whole is then stirred for 2 hours at 140-142° C., and the reaction mass is introduced into water, rendered alkaline to phenolphthalein with caustic soda solution, and vatted with sodium hydrosulfite. After infiltration to remove a small quantity of insoluble material, the dyestuff is precipitated by blowing in air, separated by filtration, washed and dried. It is a dark powder, which dissolves in concentrated sulfuric acid with a brown coloration, and dyes cotton intense greenish olive tints from a brown vat.

Example 12

2 parts of the condensation product from 1 molecular proportion of dichlorophthaloyl-fluoranthene and 2 molecular proportions of α-aminoanthraquinone of the formula

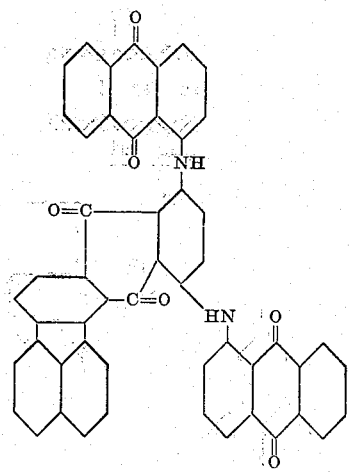

are introduced at 125-135° C. into a melt of 10 parts of aluminium chloride and 30 parts of pyridine. The temperature is then raised to 150-160° C., a portion of the pyridine being distilled. After stirring for 2 hours at 150-160° C. the reaction is complete. The melt is stirred into 1000 parts of caustic soda solution of 5 per cent. strength, vatted, and filtered to remove a small quantity of insoluble material. The dyestuff is completely precipitated by blowing in air, separated by filtering with suction, washed, and dried. It is a dark powder which dyes cotton from an olive vat fast olive-brown tints.

The starting material used in this example may be prepared as follows:

4.01 parts of 3':6'-dichlorophthaloyl-fluoranthene (obtained as described in German Patent No. 624,918), 4.46 parts of α-aminoanthraquinone, 3 parts of sodium acetate and 0.3 part of cuprous chloride are heated in 85 parts of dry nitrobenzene at the boil for 15 hours, while stirring. The precipitated reaction product is filtered with suction while hot, washed with nitrobenzene and alcohol, and extracted by boiling with dilute hydrochloric acid. When dry it is a black powder, which dissolves in sulfuric acid with a green coloration, and melts at 450° C. with decomposition.

Example 13

2 parts of the condensation product from 1 molecular proportion of 3':6'-dichlorophthaloyl-fluoranthene and 2 mols of 4-amino-1:1'-dianthrimide are melted with 10 parts of aluminium chloride and 30 parts of pyridine by the procedure described in the first paragraph of Example 12. The dyestuff so obtained is a dark colored powder, which dyes cotton fast blackish brown tints from an olive vat.

The starting material used in this example is a black powder which dissolves in sulfuric acid with a grey-green coloration and does not melt below 450° C. It can be prepared by the procedure described in the last paragraph of Example 12.

Example 14

An intimate mixture of 25 parts of aluminium chloride and 4 parts of sodium chloride is liquefied by introducing sulfur dioxide. 2 parts of the condensation product from 1 molecular proportion of 3':6'-dichlorophthaloyl-fluoranthene and 2 mols of 1-amino-5-benzoylaminoanthraquinone are introduced into the melt so obtained. The reaction is finished after stirring for one hour at 40-45° C. and for a further hour at 85-90° C. The reaction mixture is poured on to ice, 20 parts of concentrated hydrochloric acid are added, the whole is heated to boiling, and the precipitated dyestuff is separated by filtering with suction. It is washed free from acid, and then dispersed in 200 parts of sulfuric acid of 5 per cent. strength. The whole is cooled to 0-5° C., 0.6 part of sodium nitrite is added, and the suspension is stirred at 0-5° C. for several hours. The dyestuff so obtained is separated by filtering with suction, washed, and made into a paste with water. It dyes cotton blackish brown tints from an olive vat.

The starting material used in this example is a black powder, which dissolves in concentrated sulfuric acid with a grey coloration, and melts at 430° C. with decomposition. It can be obtained by the procedure described in the third paragraph of Example 12.

Example 15

2 parts of the starting material used in Example 14 are introduced at 50-55° C. into a mixture of 5 parts of aluminium chloride and 50 parts of dry nitrobenzene. After stirring for 5 hours at 50-55° C. the reaction mixture is introduced into ice-water, 30 parts of concentrated hydrochloric acid are added, and the nitrobenzene is distilled with steam. The precipitated dyestuff is separated by filtration, washed, and made into a paste with water. It dyes cotton brown tints from an olive vat.

Example 16

2 parts of the dyestuff obtained as described in Example 1 are vatted in 300 parts of water with the addition of 8 parts by volume of caustic soda solution of 36° Bé. and 4 parts of sodium hydrosulfite at 60° C. This stock vat is added to a dyebath, which contains in 2000 parts of water 24 parts by volume of caustic soda solution of 36° Bé. and 2 parts of sodium hydrosulfite. 100 parts of cotton are entered at 50° C., the temperature is raised to 60° C., and dyeing is carried on for one hour. The cotton is squeezed, oxidized in air, rinsed, acidified, again rinsed, and, if desired, soaped at the boil for 20 minutes. The cotton is dyed a fast blackish brown tint.

*Example 17*

2 parts of the dyestuff obtained as described in Example 6 are vatted in the manner prescribed in the preceding example, and added to a dyebath which contains in 2000 parts of water 4 parts by volume of caustic soda solution of 36° Bé. and 2 parts of sodium hydrosulfite. 100 parts of cotton are entered at 40° C. into the dyebath, 30 parts of sodium chloride are added after ¼ hour, and dyeing is carried on for one hour while the temperature is raised to 50° C. The cotton is then finished in the usual manner. It is dyed a black-olive tint.

What we claim is:

1. A vat dyestuff of the carbazole series corresponding to the general formula

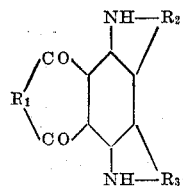

wherein $R_1$ stands for a radical selected from the group consisting of pyrene, pyrenoline and fluoranthene radicals, two neighboring carbon atoms of the said radical being directly linked to the carbonyl groups indicated in the said formula, and wherein $R_2$ and $R_3$ each stands for a radical of a vattable compound of the anthraquinone series, an $\alpha$-carbon atom of each radical $R_2$ and $R_3$ being directly attached to the —NH— bridge and the neighboring $\beta$-carbon atom directly to the aromatic nucleus indicated in the said formula.

2. A vat dyestuff of the carbazole series corresponding to the general formula

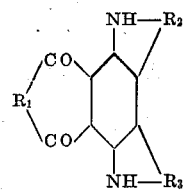

wherein $R_1$ stands for a pyrene radical, two neighboring carbon atoms of which are directly linked to the carbonyl groups, and wherein $R_2$ and $R_3$ each stands for a radical of a vattable compound of the anthraquinone series, an $\alpha$-carbon atom of each radical $R_2$ and $R_3$ being directly attached to the —NH— bridge and the neighboring $\beta$-carbon atom directly to the aromatic nucleus indicated in the said formula.

3. A vat dyestuff of the carbazole series corresponding to the general formula

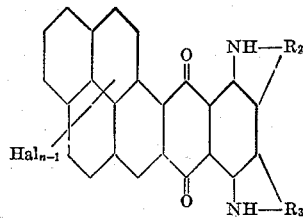

wherein $n$ stands for an integer not greater than 3, Hal stands for a halogen and $R_2$ and $R_3$ each stands for a radical of a vattable compound containing from one to two anthraquinone skeletons, an $\alpha$-carbon atom of each radical $R_2$ and $R_3$ being directly attached to the —NH— bridge and the neighboring $\beta$-carbon atom directly to the aromatic nucleus indicated in the said formula.

4. A vat dyestuff of the carbazole series corresponding to the general formula

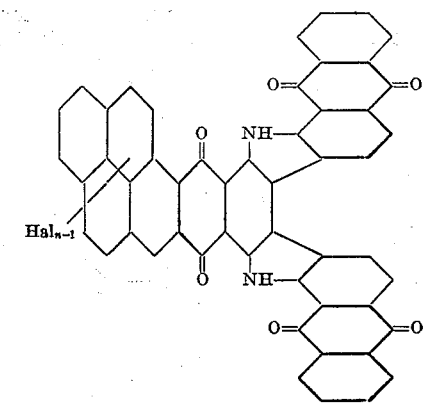

wherein Hal stands for a halogen and $n$ stands for an integer not greater than 3.

5. A vat dyestuff of the carbazole series corresponding to the general formula

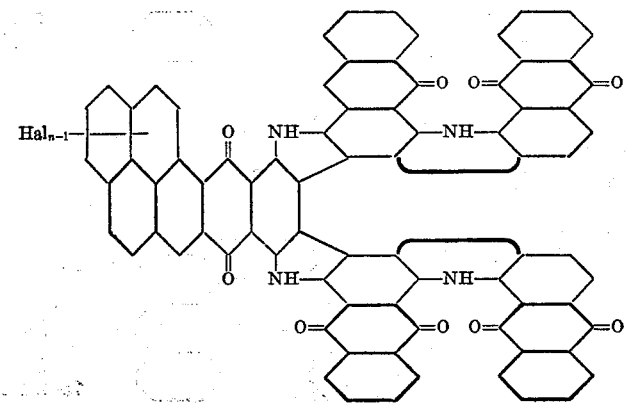

wherein Hal stands for a halogen and n stands for an integer not greater than 3.

6. A vat dyestuff of the carbazole series corresponding to the general formula

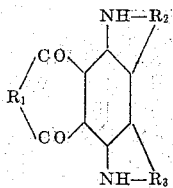

wherein $R_2$ and $R_3$ each stands for a single anthraquinone radical, an α-carbon atom of each radical $R_2$ and $R_3$ being directly bound to —NH— and the neighboring β-carbon atom directly to the aromatic nucleus indicated in the said formula, and wherein $R_1$ stands for a pyrene radical directly bound in the positions 3 and 4 to the carbonyl groups.

7. A vat dyestuff of the carbazole series corresponding to the general formula

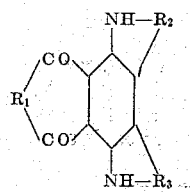

wherein $R_2$ and $R_3$ each stands for an anthrimide carbazole radical, an α-carbon atom of each radical $R_2$ and $R_3$ being directly attached to the —NH— bridge and the neighboring β-carbon atom directly to the aromatic nucleus indicated in said formula, and wherein $R_1$ stands for a pyrene radical directly bound in the positions 3 and 4 to the carbonyl groups.

8. The vat dyestuff of the formula

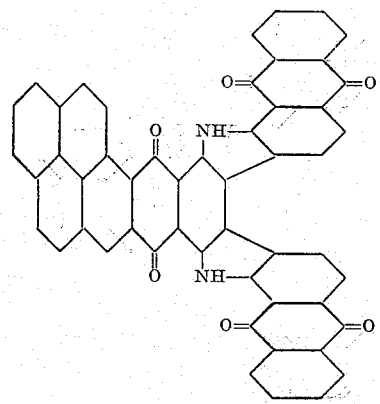

9. The vat dyestuff of the formula

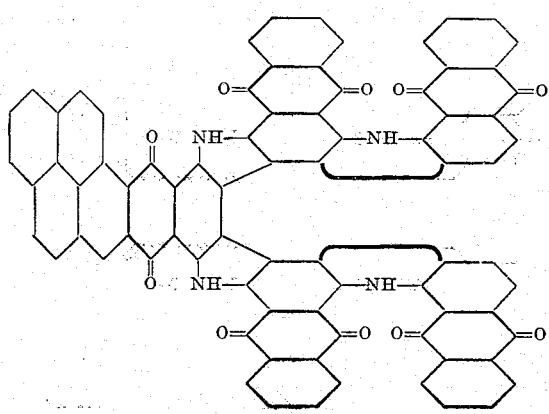

10. The vat dyestuff of the formula

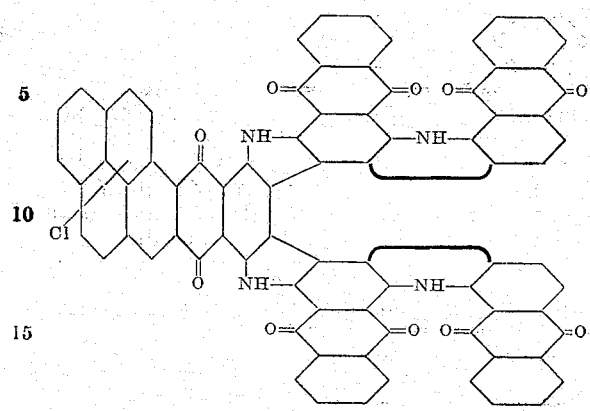

11. Process for the manufacture of vat dyestuffs of the carbazole series which comprises reacting with a catalyst of the Friedel-Crafts type a compound of the general formula

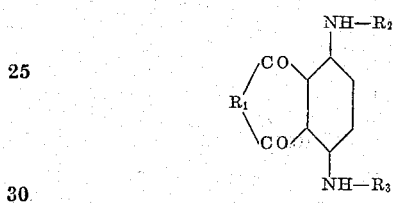

wherein $R_1$ stands for a radical selected from the group consisting of pyrene, pyrenoline and fluoranthene radicals, two neighboring carbon atoms of the said radical being directly linked to the carbonyl groups indicated in the said formula, and wherein $R_2$ and $R_3$ each stands for a radical of a vattable compound of the anthraquinone series, bound to —NH— by an α-carbon atom.

12. Process for the manufacture of vat dyestuffs of the carbazole series which comprises reacting with aluminium chloride a compound of the general formula

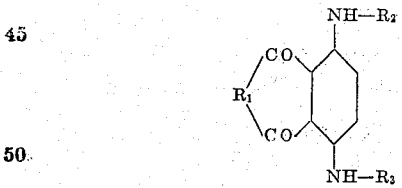

wherein $R_1$ stands for a radical selected from the group consisting of pyrene, pyrenoline and fluoranthene radicals, two neighboring carbon atoms of the said radical being directly linked to the carbonyl groups indicated in the said formula, and wherein $R_2$ and $R_3$ each stands for a radical of a vattable compound of anthraquinone series, bound to —NH— by an α-carbon atom.

13. Process for the manufacture of vat dyestuffs of the carbazole series which comprises reacting with a mixture of aluminium chloride and pyridine a compound of the general formula

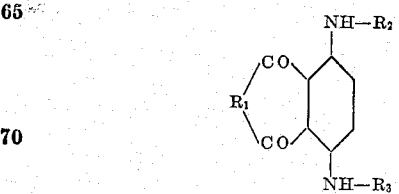

wherein $R_1$ stands for a radical selected from the group consisting of pyrene, pyrenoline and fluoranthene radicals, two neighboring carbon atoms of the said radical being directly linked to the carbonyl groups indicated in the said formula, and wherein $R_2$ and $R_3$ each stands for a radical of a vattable compound of the anthraquinone series, bound to —NH— by an $\alpha$-carbon atom.

WALTER KERN.
THEODOR HOLBRO.

REFERENCES CITED

The following references are of record in the file of this patent:

UNITED STATES PATENTS

| Number | Name | Date |
|---|---|---|
| 2,096,688 | Scheyer et al. | Oct. 19, 1937 |
| 2,219,707 | Kern et al. | Oct. 29, 1940 |

FOREIGN PATENTS

| Number | Country | Date |
|---|---|---|
| 696,011 | France | Oct. 7, 1930 |
| 725,350 | France | Feb. 12, 1932 |

Patent No. 2,539,192

Certificate of Correction

January 23, 1951

WALTER KERN ET AL.

It is hereby certified that error appears in the printed specification of the above numbered patent requiring correction as follows:

Column 1, line 45, for "fluoranthane" read *fluoranthene*; column 10, lines 51 to 61, for that portion of the formula reading

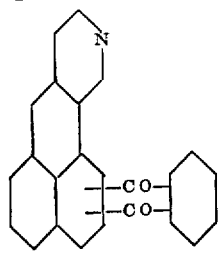 read 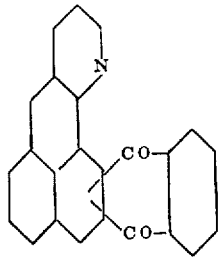

column 11, line 29, for "infiltration" read *filtration*;
and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*